(12) United States Patent
Barkan et al.

(10) Patent No.: US 8,203,616 B2
(45) Date of Patent: Jun. 19, 2012

(54) IMAGING SCANNER

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1129 days.

(21) Appl. No.: 11/026,855

(22) Filed: Dec. 30, 2004

(65) Prior Publication Data

US 2006/0146171 A1 Jul. 6, 2006

(51) Int. Cl.
*H04N 5/228* (2006.01)
(52) U.S. Cl. ............... 348/222.1; 348/373; 348/374; 348/375; 348/376
(58) Field of Classification Search ............ 348/222.1, 348/373–376; 359/17, 19
See application file for complete search history.

(56) References Cited

U.S. PATENT DOCUMENTS

| | | | | |
|---|---|---|---|---|
| 4,963,756 | A | * | 10/1990 | Quan et al. .................. 250/568 |
| 5,796,091 | A | * | 8/1998 | Schmidt et al. .......... 235/472.01 |
| 6,186,400 | B1 | | 2/2001 | Dvorkis |
| 6,592,040 | B2 | | 7/2003 | Barkan |
| 6,648,228 | B2 | | 11/2003 | Dvorkis |
| 6,669,097 | B2 | | 12/2003 | Dvorkis |
| 6,817,529 | B2 | | 11/2004 | Barkan |
| 2002/0066851 | A1 | * | 6/2002 | Hennick et al. .............. 250/216 |
| 2004/0195337 | A1 | * | 10/2004 | Silverbrook et al. ..... 235/472.02 |
| 2005/0087601 | A1 | * | 4/2005 | Gerst et al. .................... 235/455 |
| 2005/0092841 | A1 | * | 5/2005 | Barkan .................. 235/462.25 |

* cited by examiner

*Primary Examiner* — Yogesh Aggarwal
(74) *Attorney, Agent, or Firm* — Nong-Qiang Fan

(57) ABSTRACT

Methods and apparatus for scanning objects using an imaging scanner comprising a housing, a circuit board comprising a mounted imaging sensor and an optical module positioned in front of the imaging sensor, creating at least part of an optical path between the optical module and the sensor. In an embodiment, the circuit board is positioned in the housing and the imaging sensor is tilted with respect to the optical path.

30 Claims, 7 Drawing Sheets

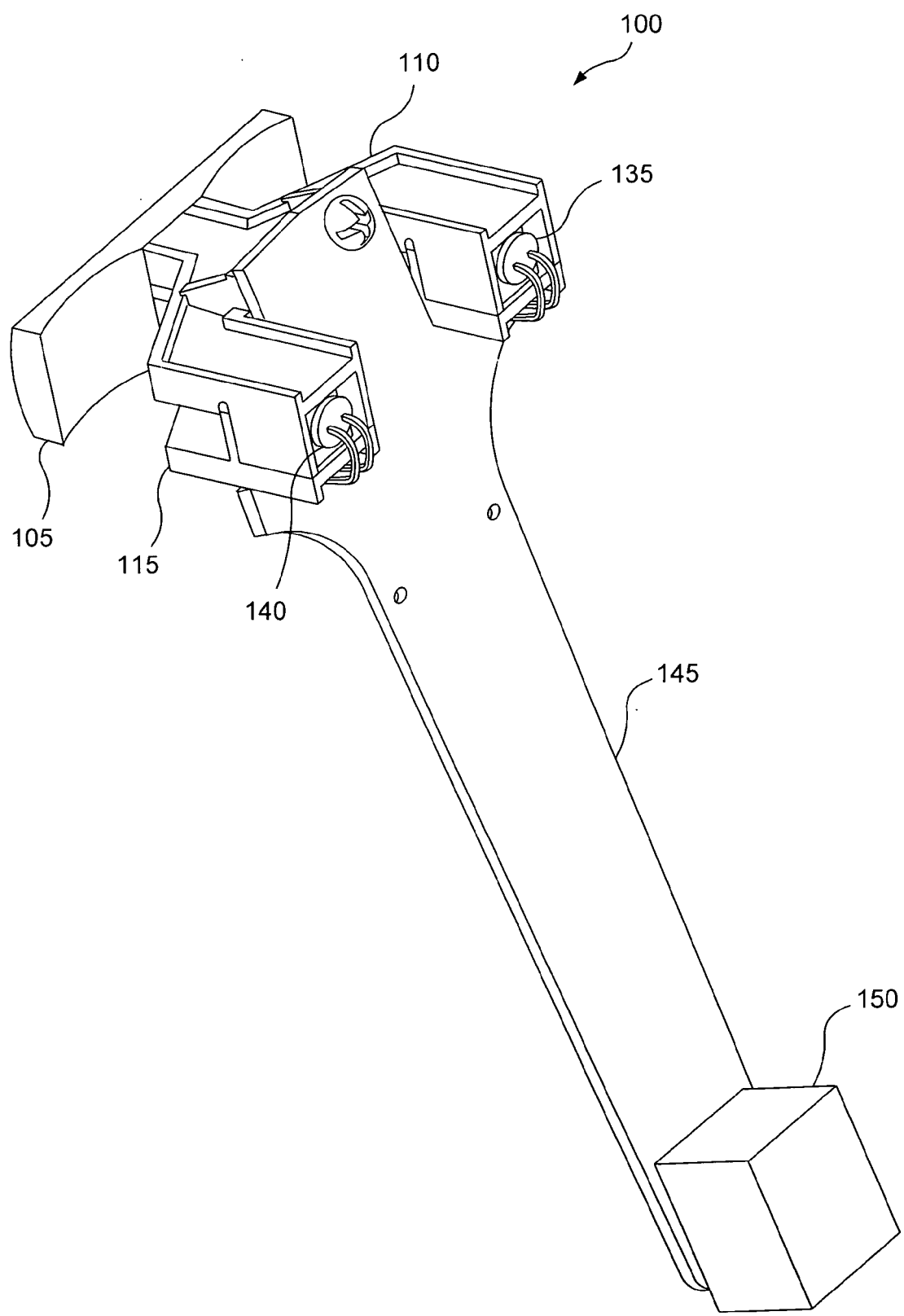
F I G. 3

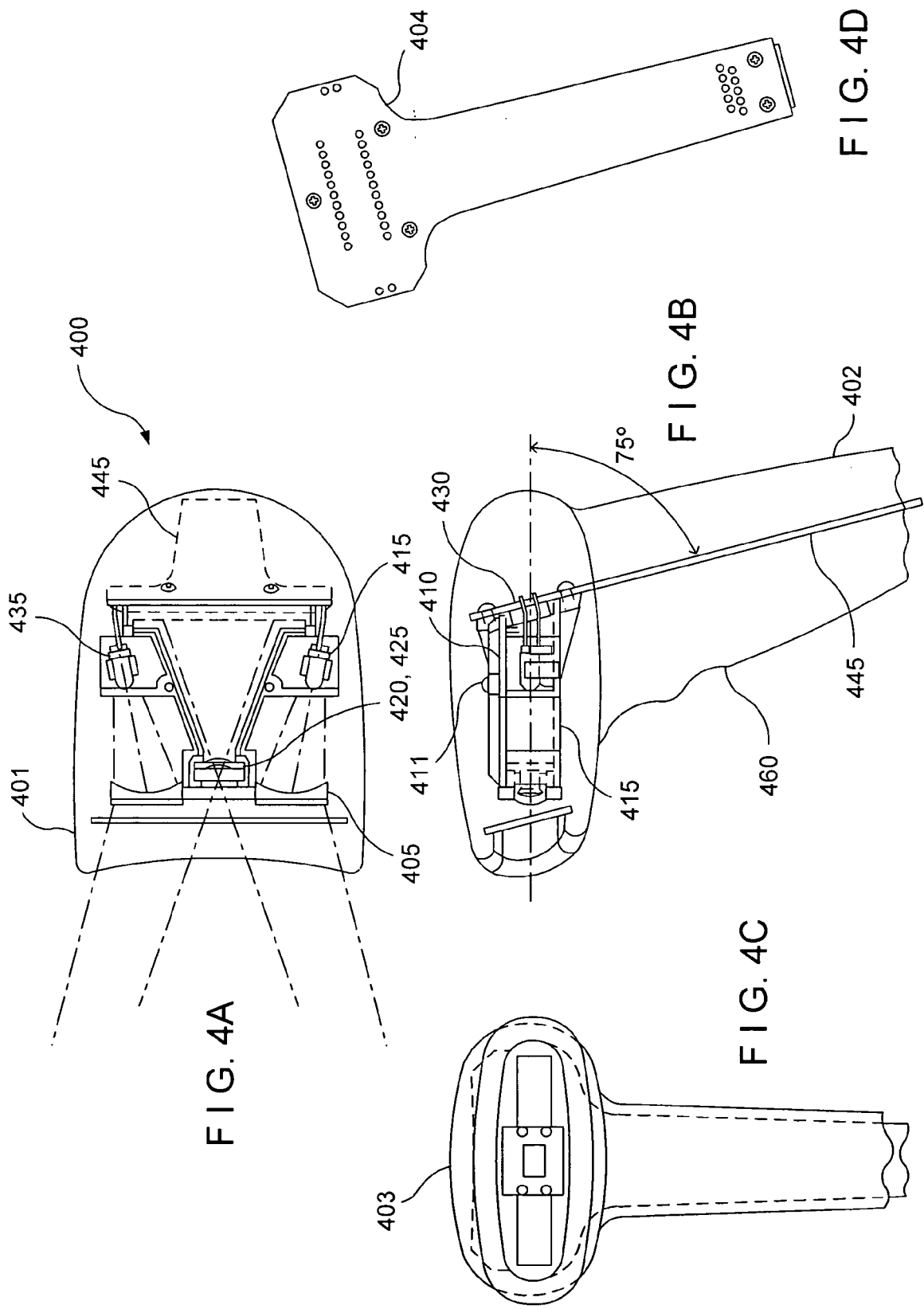

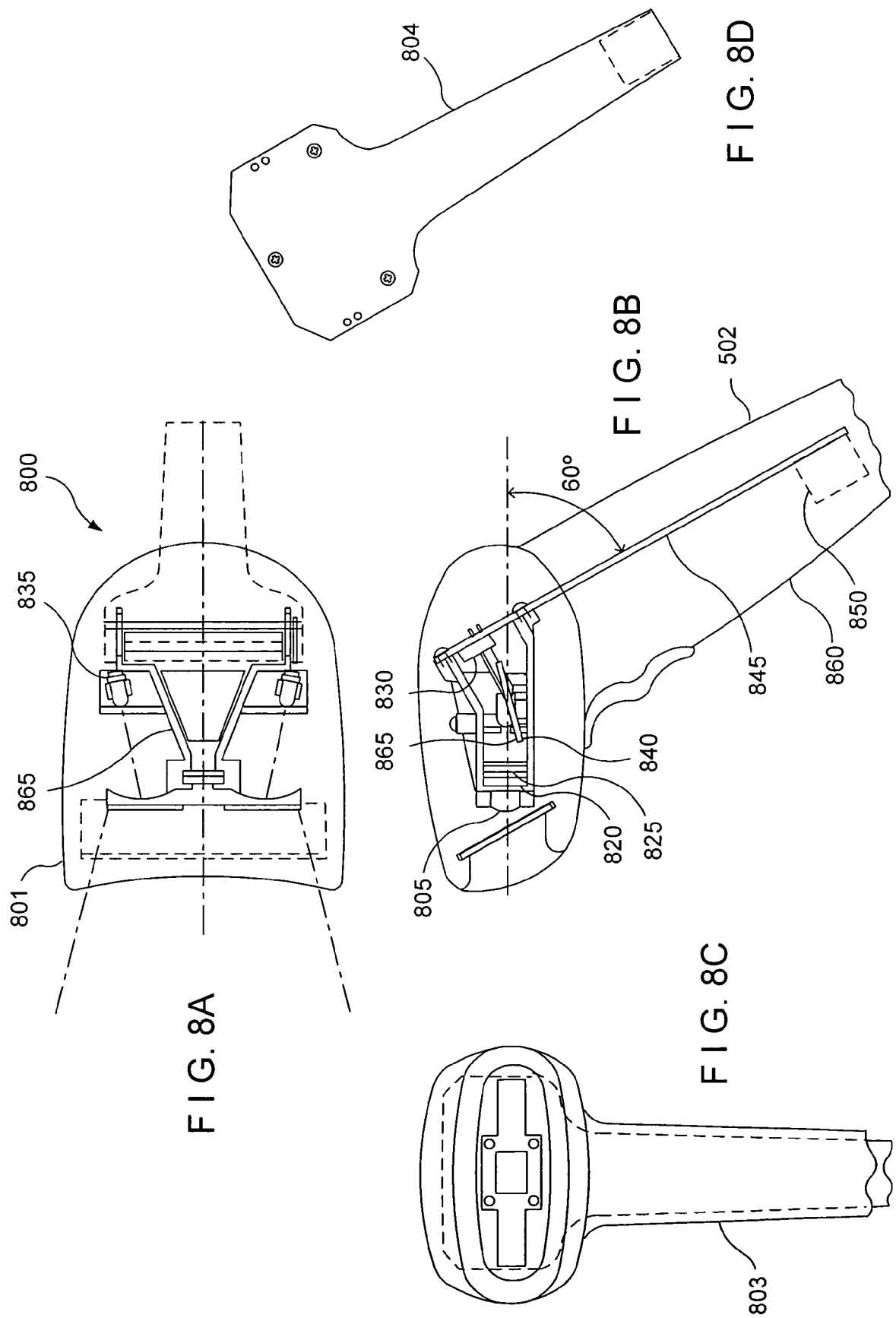

IMAGING SCANNER

FIELD OF THE INVENTION

The invention is directed to handheld imaging scanners, and more particularly to a scanner having a single generally vertically mounted circuit board.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, and manage a wide variety of objects under a similar system and many other functions. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to products. They can be used to identify important objects, places, etc. Dataforms can also be other objects such as a trademarked image, a person's face, etc.

Scanners that can read and process the dataforms have become common. Bar code scanners having generally gun shaped housings were originally introduced around the year 1980. At that time, laser scanning technology was used because only laser scanning could provide enough working range to make the aim-and-shoot ergonomics of a gun shaped housing meaningful. Around the same time, bar code scanners using linear CCD sensor arrays, or imaging scanners, were also introduced. The working range of the first imaging scanners were less than laser scanners. Thus, imaging scanner housings were designed to facilitate scanning by touching a wide mouth of the scanner to the barcode, as opposed to shooting at the barcode from a distance, as could be done with a laser scanner. Eventually, the working range of imaging scanners were expanded, and scanner developers began to design them with gun shaped housings, similar to what had become popular with laser scanners.

When scanning from a distance, an ergonomic scanner housing can be shaped like a gun. Several companies build and sell gun shaped, extended range, imaging scanners. The general construction of known imaging scanners comprise an optical assembly located in the head or gun barrel portion of the housing. This optical assembly includes a lens positioned towards the front of the housing, that focuses an image of the barcode onto the sensor array located towards the back of the housing. Two or more light emitting diodes (LEDs) are mounted near the back of the housing and are focused, with additional lenses, onto the barcode, to illuminate the barcode and to visually guide a user as to where the scanner is aimed. The sensor, the LEDs, and the lenses are mounted together in a molded plastic assembly that maintains their positions with respect to each other so that their desired functions can be performed.

Additionally, the image scanner comprises a circuit board carrying the various electronics that process and decode dataforms, control the sensor and the LEDs and perform other scanner functions. The senor and LEDs are electrically connected to the circuit board and the circuit board is conventionally mounted horizontally in the head of the scanner, just below the optical assembly.

A communication interface that enables the scanner to communicate with a host computer or a cash register is also located in the housing, and electrically coupled to the circuit board. For example, the communication interface can be implemented as a communication interface connector with interface circuitry. Some known scanners position the interface circuitry in the head of the scanner housing on the same circuit board as the other electronics, while others position the interface circuitry on a second circuit board located in the housing's handle.

When determining the relative position of the sensor, the LEDs and the circuit board, in known scanners, the needs of the optical system are considered before the ease of making their electrical connections. Therefore, to make the electrical connections between the sensor, the LEDs and the circuit board, a flexible circuit assembly, or flex circuit, having a complex shape is shaped and folded around the optical assembly to allow soldering. Flex circuits are also used to electrically connect to indicator LEDs that are visible through transparent areas in the top of the housing and to audio indicators, or beepers, which audibly indicate when the scanner has decoded a barcode. The circuit board can also comprise connectors that are soldered to the board, which allow flex circuits to connected to the circuit board by inserting the flex circuit into the connector. The connector allows the circuit board to be electrically connected as necessary, via the flex circuit, to the electronic components mounted in the optical assembly.

The disadvantage of the known system described above is the cost of the flex circuits and connectors, sometimes costing a significant percentage of the entire material cost of the scanner. In addition, the flex circuit can disengage from their connection to the circuit board if the scanner is dropped on the floor, causing the scanner to fail. Another disadvantage is that the sensor, LEDs and beeper must be hand soldered to the flex circuit, requiring skillful and highly paid manufacturing people.

Gun-shaped scanners generally communicate with a host computer or cash register via a cable coupled to a communication interface connector located at the bottom of the handle of the scanner. This communication interface connector must be electrically connected to the rest of the scanner's circuitry, which is, as described above, at least partially mounted on a circuit board in the scanners head. Several strategies have been employed to make this electrical connection. Some scanners comprise an additional flex circuit connecting the main circuit board, in the head of the scanner, to the communication interface connector in the bottom of the handle. The communication interface connector has to be mechanical secured to the bottom of the handle to hold the interface connector in its desired position. The mechanical connection generally consists of a molded plastic part held in place with a screw. The extra components, and the labor needed to install them further increase the cost of the scanner. In addition, scanner reliability is further reduce because there are more flex circuits that can become disconnected from the circuit board if the scanner is dropped or subject to vibration.

Another way to electrically couple the communication interface connector to the bottom of the handle is to mount a second circuit board in the handle, with the interface connector soldered directly to the bottom end of the second board. A small ribbon cable or flex circuit is still needed to couple the second circuit board to the main circuit board located in the head of the scanner. The ribbon or flex circuit is normally coupled the circuit board through connectors located on the board. This assembly is expensive and can be unreliable because the ribbon or flex circuit can become disconnected from its connectors at either board. The secondary circuit board is held in place using a screw and retaining bracket, adding additional cost.

Laser scanners having a single vertically oriented circuit board have been constructed, but the practicalities of building an imaging scanner with a similar construction are different. Some known laser scanners include tilted sensors, but since image quality is so important in imaging scanners, known imaging scanners do not include tilted sensors.

Accordingly, there is a need for an imaging scanner that can lower the cost of the scanner and increase reliability by eliminating flex circuits, reducing the amount of soldering and reducing the number of circuit board connectors.

SUMMARY OF THE INVENTION

The invention as described and claimed herein satisfies this and other needs, which will be apparent from the teachings herein.

An exemplary imaging scanner implemented in accordance with an embodiment of the invention comprises a housing bounding an internal area, a circuit board comprising a mounted imaging sensor for scanning dataforms and an optical module positioned in front of the imaging sensor, creating at least part of an optical path between the optical module and the sensor. The circuit board is positioned in the housing and the sensor is tilted with respect to the optical path.

It has been found that a handheld gun shaped scanner is more ergonomic when the handle of the scanner is tilted with respect to a vertical axis. In an embodiment of the invention, the circuit board is positioned in the handle of the scanner so that the imaging sensor on the board is not perpendicular to the optical path. There is some loss in image capture quality in this configuration, but it is not significant. In some embodiments, when the circuit board is positioned parallel to a slanted handle, the sensor can be mounted to the board so that it is perpendicular to the optical path.

In an embodiment of the invention, having the imaging sensor directly on the circuit board decreases the number of parts inside the scanner and decreases the number of connections between parts. Both of those factors decrease the cost of the scanner and increase scanner reliability.

In some embodiments, the scanner further comprises an illumination module or light source implemented as a light emitting diode (LED). Depending on the sensor used and/or the number of LEDs used, the LEDS can be mounted next to the sensor and on the same plane as the optical path, above the sensor, behind the sensor, etc. When the LEDs are located above the sensor, the scanner can comprise focus lenses that redirect the light to a path parallel to the optical path.

In an alternate embodiment of the invention, a prism or mirror can be placed in the optical path to bend the path. The optical path is bent so that it is perpendicular to a sensor coupled to a circuit board.

An exemplary scanner can also comprise a communication interface connector positioned at the bottom of the circuit board. The communication interface connector comprises a port for connecting an external cable, for communication with an external device and/or to receive power.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

FIG. 3 illustrates a rear view of the imaging scanner of FIG. 2.

FIG. 4 illustrates an orthographic projection of an alternate embodiment of an imaging scanner implemented in accordance with the invention.

FIG. 8 illustrates an orthographic projection of another embodiment of an imaging scanner implemented in accordance with the invention.

DETAILED DESCRIPTION OF EXEMPLARY EMBODIMENTS

There will now be shown and described in connection with the attached drawing figures several exemplary embodiments of methods and apparatus for an imaging scanner.

An embodiment of the invention positions an imaging scanner circuit board in a generally vertical orientation which facilitates the positioning and electrical connections of the scanner's components, such as, for example a sensor, LEDs, communication interfaces, etc.

Figure 1:
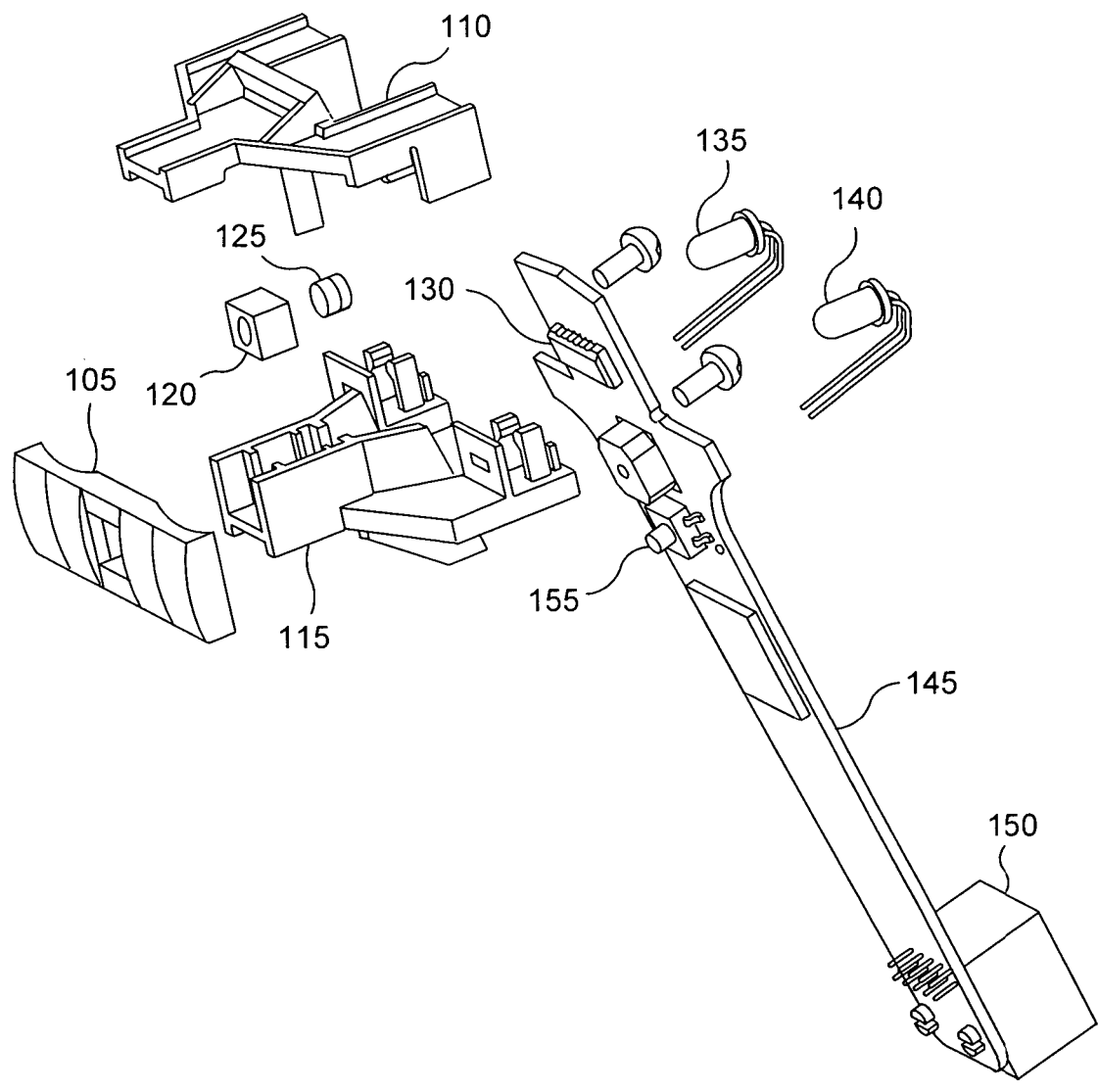
FIG. 1 is a three dimensional drawing of the internal components of an imaging scanner implemented in accordance with the invention.
Figure 2:
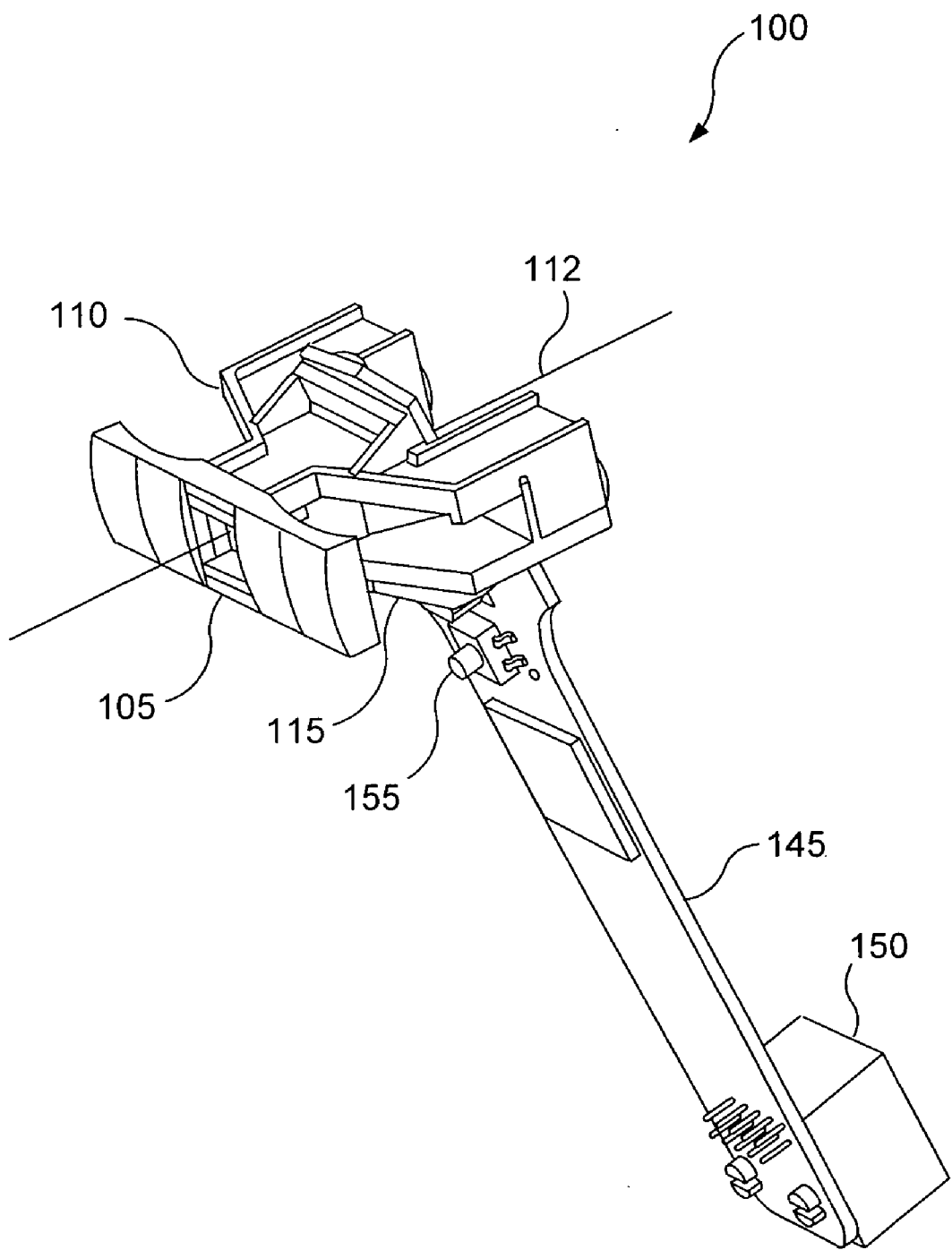
FIG. 2 illustrates a combined three dimensional view of the components illustrated in FIG. 1.

FIG. 1 illustrates the components of an exemplary imaging scanner 100 implemented in accordance with the invention. The exemplary imaging scanner comprises a circuit board 145, an imaging sensor 130, an optical module 125, an optical module holder comprising an aperture 120, camera housing 110, 115, LEDs 135, 140, illumination lens 105, communication interface 150 and switch 155. FIG. 2 illustrates the components of the imaging scanner 100 combined into a single unit. FIG. 3 illustrates a rear view of the imaging scanner 100. The exemplary imaging scanner 100 further comprises a gun shaped housing, not shown, comprising a trigger, not shown, that activates the switch 155.

The circuit board 145 can extend from the bottom of a handle of the gun shaped housing to the top of a barrel portion of the housing, also known as the head of the housing. The plane of the circuit board 145 extends from one side of the scanner to the other, as opposed to extending from the front to back of the scanner housing. The sensor 130 can be soldered directly to the front surface of the circuit board 145. The circuit board also comprises the processing units, memory and other electronic components that are used to operate an imaging scanner.

A camera body, comprising a top portion 110, and a bottom portion 115, can be mounted to the front surface of the board 145, and can hold an optical module 125 and an optical module holder 120 in a desired position in relation to the sensor 130. In the exemplary scanner 100, illustrated in FIG. 1, a small imaging sensor 130 is used, and the lens 125 and lens holder 120 are positioned at a distance which best focuses an image on the sensor 130. The optical module 120, is implemented as a lens 120 and the optical module holder 125 is implemented as a lens holder 125. The optical path of the lens 120 is parallel to the horizontal axis.

The illumination lens 105, which concentrates light from the LEDs 135, 140 onto an object in a field of view of the scanner 100, can be coupled to the front of the camera body 110, 115. The generally vertical orientation of the circuit board 145 allows the sensor 130 and the LEDs 135, 145 to be soldered directly to the circuit board without the need for any flex circuitry or other wiring. The LEDs 135, 145 are optimally positioned with respect to the illumination lens 105 to illuminate objects. In exemplary scanner 100, the rear view illustrated in FIG. 3, shows that the LEDs 135, 140 are positioned behind the sensor 130. Alternatively, depending on the LEDs and/or the illumination lens used, the relative positions of the LEDs and lens may be adjusted to obtain a desired illumination. The desired illumination may change depending on the field of view of the scanner.

Since the circuit board 145 extends down to the bottom of the handle, a communication interface 150 can be positioned at the bottom of the circuit board 145 so that external cables can be plugged in. In one exemplary embodiment of the invention, the communication interface comprises an interface connector 150. The communication interface connector 150 can be soldered directly to the circuit board without the need for any intervening flex circuits or secondary circuit boards. The communication interface connector 150 can be used to couple the scanner 100 to another device, for example a computer, a cash register, etc. The scanner 100 can also receive power from communication interface connector 150.

Some embodiments of the exemplary scanner 100 can also comprise an indicator LED (not shown). The indicator LED can be soldered near the top edge of the circuit board and be positioned so that it is visible through a transparent section of the housing top cover. Additionally, an audible indicator (not shown) can also be soldered directly to the circuit board 145 so that sounds escape through suitable openings in the housing. The sounds can indicate to a user when a dataform has been successfully read.

An exemplary scanner 100 can also comprise a switch 155 that begins a scanning operation when a scanner user presses a trigger. The switch 155 can also be soldered directly to the front surface of the circuit board 145, eliminating the need to run additional wires to the switch 155. Positioning these scanner components on a single circuit board 145 eliminates the need for expensive and unreliable flex circuits, ribbon cables or internal connectors. In addition, the communication interface connector 150 is secured at the bottom of the handle without a secondary circuit board or additional mechanical components.

In an embodiment of the invention, the handle portion of the gun-shaped housing can be tilted back with respect to an imaginary vertical axis that is perpendicular to the horizontal axis of the barrel portion of the scanner 100. Experimentation has shown that a handle tilt of around 15 to 20 degrees, off the vertical axis, provides an ergonomic shape when reading objects. In other embodiments, greater or smaller angles can be used. In order to accommodate this tilted handle, the circuit board 145, which extends down into the handle, can be tilted with respect to the head of the scanner. Therefore, a side view of the circuit board illustrated in FIG. 2, would appear tilted with respect to the vertical axis, while the camera body 110, 115 would appear parallel to the horizontal axis.

Since the sensor 130 is directly soldered onto the circuit board 145, the light sensitive surface of the sensor 130 is tilted with respect to an optical axis 112 of the optical assembly that projects the image of the dataform onto the sensor 130. The optical axis 112 is parallel to the horizontal axis. If, for example, a handle angle of 15 degrees is used, the surface of the sensor is tilted by 15 degrees from the vertical axis, and is not perpendicular to the optical axis 112. Conventionally, the sensor is positioned so that its sensitive surface is perpendicular to the optical axis 112 of the optical system.

In alternate embodiments of the invention, the sensor 130 can be mounted at an angle to the circuit board 145, so that the sensor 130 is perpendicular to the optical axis 112. For example, a sensor 130 can comprise long leads on the bottom of the sensor and shorter lead on the top of the sensor 130. When the sensor 130 is coupled to the circuit board 145, the long leads position the bottom of the sensor away from the circuit board while the shorter leads on the top of the circuit board position the top of the sensor closer to the circuit board. The length of the longer leads on the bottom of the sensor can be adjusted so that the sensor 130 is perpendicular to the optical axis 112. In other embodiments, the sensor 130 has equal length leads and the tops leads are pushed through the circuit board 145, while the leads on the bottom of the sensor are not pushed through as far as the leads on the top of the sensor. Alternatively, a special socket can be created that positions the sensitive surface of the sensor 130 at an angle to the board 145 and perpendicular to the optical axis 112.

FIG. 4 illustrates another exemplary imaging scanner 400 implemented in accordance with the invention. The orthographic projection of the scanner 400 comprises a plan view 401, a side view 402, a front view 403 and a rear view 404. Scanner 400 comprises a circuit board 445, an imaging sensor 430, a lens 425, a lens holder comprising an aperture 420, camera housing 410, 415 coupled together by a screw 411, LEDs 435, 440 and an illumination lens 405. Although, not shown, scanner 400 can also comprise a communication interface connector located at the bottom of the circuit board 445. The circuit board 445 of the scanner 400 is positioned in a handle of a housing 460. The handle is angled 15° away from a vertical axis, and the circuit board 445 is parallel to the handle of the housing 460.

As in the previous embodiment, the sensor 430 is directly coupled to the circuit board 445. Therefore, the sensor 440 is not perpendicular to an optical path created by the camera housing 410, 415 and the optical components 420, 425. The imaging sensor 430 and lens 420 used in scanner 400, are positioned a greater distance away from each other, than in the previous embodiment. The choice of lens and/or sensor determines which configuration is appropriate. For example larger sensors may require a greater focal length.

Since there is more space between the sensor 430 and the lens 420, the LEDs 435, 430 are positioned in front of the sensor 430 and parallel to the optical path. The light from the LEDs 435, 440 is focused by illumination lens 405 to illuminate a targeted object in the field of view of the scanner.

Figure 5A:
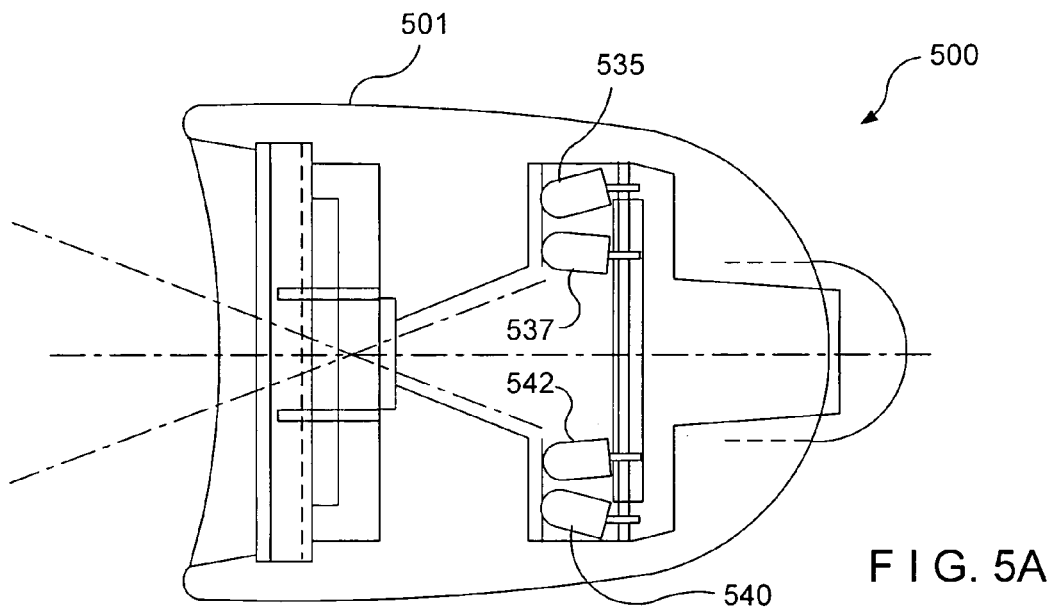
FIG. 5 illustrates a plan view and a side view of another embodiment of an imaging scanner implemented in accordance with the invention.
Figure 5B:
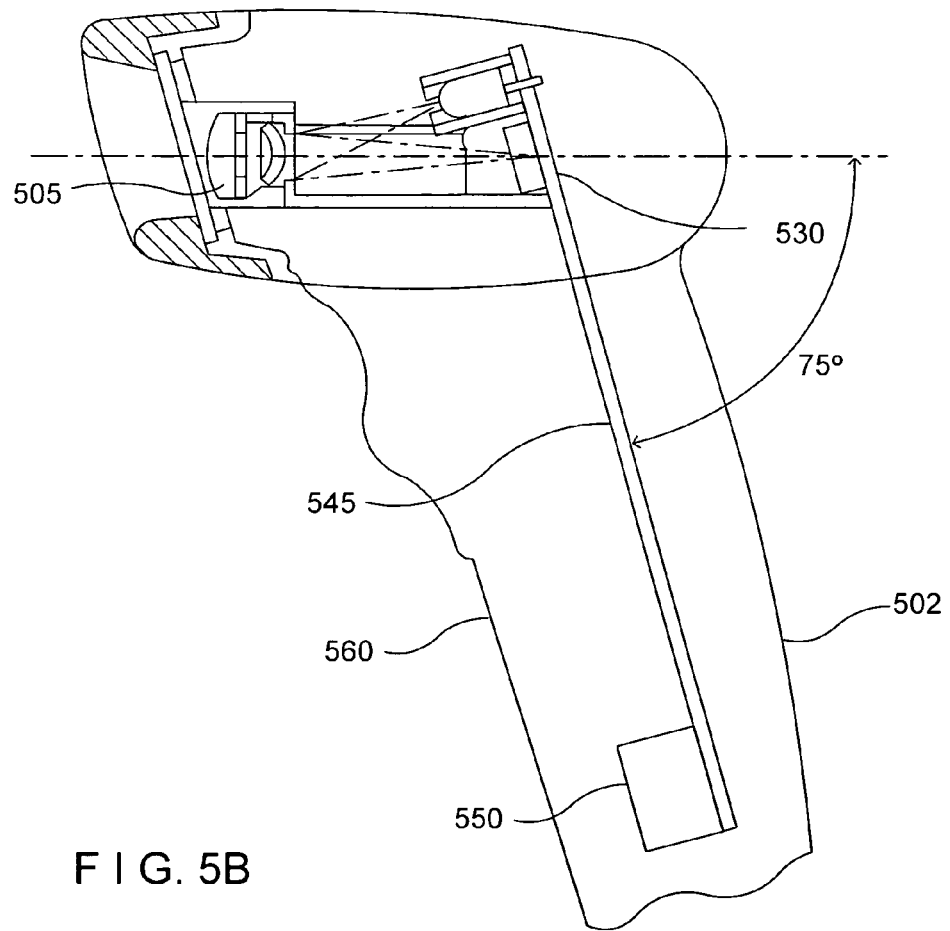

In general, a scanner performs better when a target dataform is brightly illuminated. Therefore, in some embodiments of the invention, it may be desirable to increase the amount of illumination provided by an imaging scanner by increasing the number of LEDs in the scanner. FIG. 5 illustrates an exemplary scanner 500 comprising illumination modules or light sources implemented as LEDs 535, 537, 540, 542. FIG. 5 illustrates a plan view 501 and a side view 502. The LEDs are directly coupled to the circuit board 545 and are positioned above the sensor 530 so that they do not block the optical path. Scanner 500 also comprises a gun shaped housing 560 and a communication interface connector 550 positioned at the bottom of the circuit board 545.

Since the LEDs 535, 537, 540, 542 are directly coupled to the circuit board 545, they are tilted with respect to the optical axis 112. Therefore, the illumination from the LEDs 535, 537, 540, 542, may not properly exit the housing and may not properly illuminate a target object. Thus, the exemplary scanner 500 comprises an illumination lens 505 that bends the illumination path of the LEDs 535, 537, 540, 542 so that it is parallel to the optical path.

Figure 6:
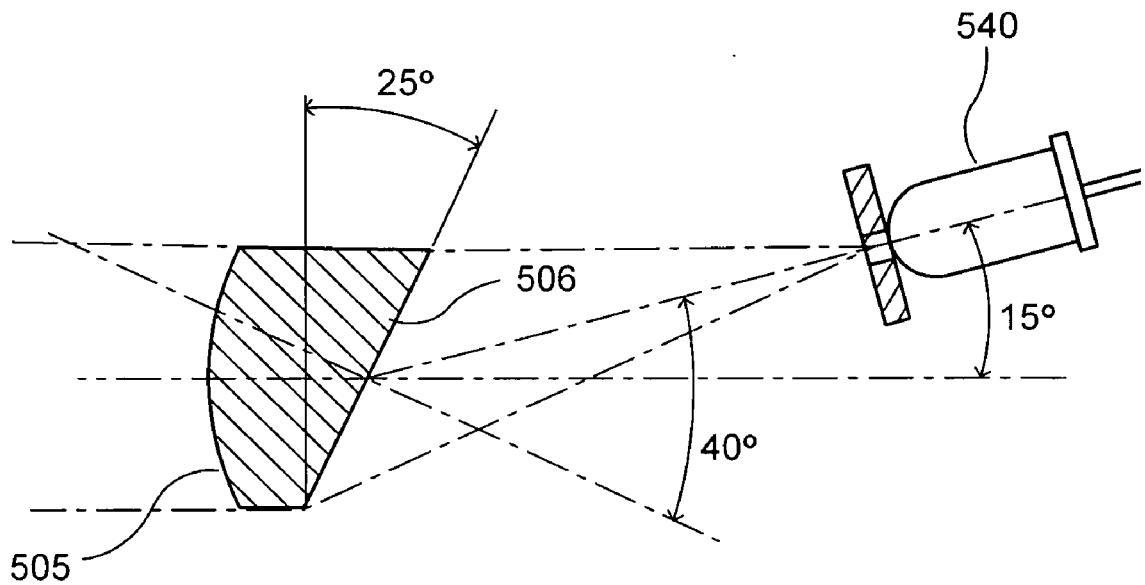
FIG. 6 illustrates an exemplary lens that can be used with the exemplary scanner embodiment illustrated in FIG. 5.

FIG. 6 illustrates an exemplary illumination lens 505 implemented in accordance with the invention. In one exemplary embodiment, the LEDs 535, 537, 540, 542 are tilted 15° away from a vertical axis because they are directly coupled to a circuit board 545 that is positioned in a handle that is tilted 15° away from the vertical axis. The receiving side 506 of the illumination lens 505, i.e., the side facing the LEDs 535, 537, 540, 542, is cut diagonally at an angle 25° from the vertical axis to bend the light from the LEDs 535, 537, 540, 542 so that it is parallel to the optical path. The length of the illumination lens 505 may have to be increased to accommodate the slanted side.

Figure 7:
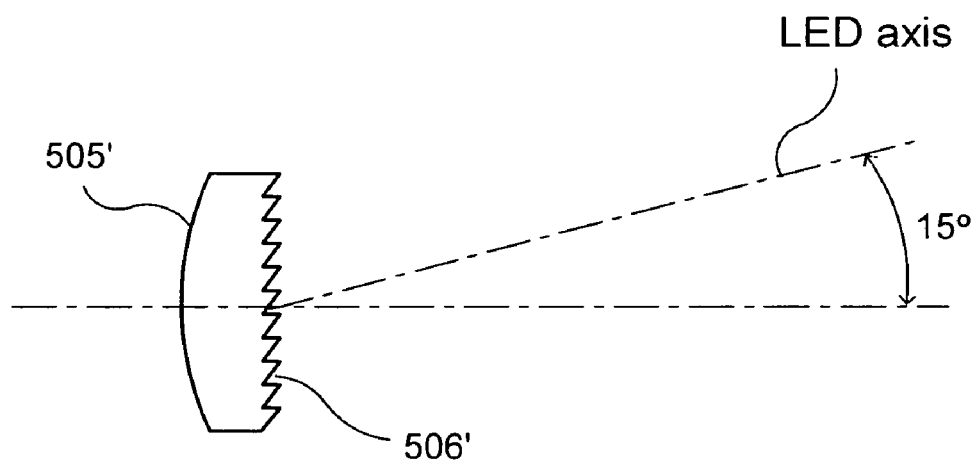
FIG. 7 illustrates an alternative lens that can be used with the exemplary scanner embodiment illustrated in FIG. 5.

FIG. 7 illustrates an alternate illumination lens embodiment 505'. Illumination lens 505' reduces the length of the illumination lens 505' by placing a plurality of small diagonal slants down the receiving side 506' of the illumination lens 505'.

The exemplary configuration of scanner 500 is not limited to a four LED embodiment. In alternate embodiments more or less LEDs can be used to obtain the benefits of closely coupling the LEDs to the circuit board 530.

In another embodiment of the invention, a mirror or prism can be positioned between the sensor and the imaging lens so that it folds the optical path to be perpendicular to the sensor. FIG. 8 illustrates an exemplary scanner 800 comprising an optical path fold mirror 865. FIG. 8 illustrates a plan view 801, a side view 802, a front view 803 and a rear view 804 of scanner 800. The scanner 800 also comprises a circuit board 845, an imaging sensor 830, a lens 825, a lens holder comprising an aperture 820, LEDs 835, 840, an illumination lens 805 and communication interface connector 850.

The exemplary scanner 800 comprises a gun shaped housing 860 comprising a handle that is tilted 30° away from a vertical axis. The circuit board 845 is positioned inside and parallel to the handle of the housing 860. The sensor 830 is directly coupled to the circuit board 845, so it is tilted at a 30° angle from the vertical axis. The imaging lens 825 and lens holder 820 are positioned in the front or middle of the housing's barrel so that their optical axis is parallel to the horizontal axis.

The optical path fold mirror 865 is positioned between the optical module 820 and the sensor 830, and is angled so that the optical path is perpendicular to the sensor 830. The angle of the optical path fold mirror 865 can be adjusted to the angle of the sensor 830.

The LEDs 835, 840 are positioned between the scanner optics 820, 825 and the sensor 830 on the same plane as the optical path fold mirror 865. LED 835 is on the right side of the fold mirror 865, and LED 840 is on the left side of fold mirror 865. The LEDs can be coupled to the circuit board 845 using leads.

Although the scanner 800 comprises a handle that is tilted 30° away from the vertical axis, the invention is not limited to this embodiment. An optical path fold mirror can be used with scanner handles that are bend at a plurality of different angles.

The various features of the different embodiments of the invention described herein can, in other embodiments, be combined in a plurality of different combinations. Additionally, in some embodiments the scanner further comprises wireless connectivity, and some of the scanner functions may be performed through a wireless channel.

In an exemplary imaging scanning operation, a scanner user aims a scanner at a dataform on a target object and presses a trigger on the scanner. The trigger presses a switch on the circuit board of the scanner, which begins a scanning operation. An exemplary scanning operation comprises illuminating the dataform using, for example LEDS. The illumination is focused using an illumination lens, and the illumination lens may be configured to bend the illumination path depending on how the LEDs were mounted to the circuit board.

Following illumination, the sensor captures a digital representation of the dataform and sends the data to memory and/or to the scanner's processing units for analysis. In some embodiments, the sensor is coupled to a circuit board and is not perpendicular to the optical path, in other embodiments, a fold mirror is placed in the optical path to bend the path so that it is perpendicular to the sensor. Still in other embodiments, the sensor can be coupled to the circuit board so that the bottom of the sensor is positioned away from the board while the top of the sensor is positioned closer to the circuit board, making the sensor perpendicular to the optical path.

If the scanner successfully decodes the dataform, the scanner can activate an indicator light and/or emit an audible beep. If the scanner fails to decode the dataform, it can, in some embodiments, do nothing or activate an alternate indicator light and/or emit an alternate audible beep.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. An apparatus comprising:
   a handle;
   a trigger on the handle;
   a gun-shaped housing having a barrel portion and a handle portion;
   a rigid circuit board in the gun-shaped housing;
   an optical module positioned in the gun-shaped housing, the optical module having an optical axis that is substantially parallel to the direction as pointed by the barrel of the gun-shaped housing;
   an imaging sensor having a sensor array directly mounted on the rigid circuit board, wherein the imaging sensor is tilted with respect to the optical axis of the optical module positioned in front of the imaging sensor; and
   a switch on the rigid circuit board, wherein the rigid circuit board has a part thereof extending to the handle portion of the gun-shaped housing to a sufficiently deep position for configuring the switch at a location to enable a pressing of the trigger on the handle to begin a scanning operation.

2. The apparatus of claim 1, wherein the imaging sensor is coupled to the circuit board so that it is perpendicular to the optical axis of the optical module.

3. The apparatus of claim 1, wherein a front plane of the sensor is tilted with respect to the optical axis of the optical module.

4. The apparatus of claim 1, wherein the optical module is a lens.

5. The apparatus of claim 4, wherein the optical module is positioned in an optical module holder comprising an aperture.

6. The apparatus of claim 1, wherein the scanner comprises a plurality of light sources.

7. The apparatus of claim 1, further comprising a second optical module in front of the light source, wherein the second optical module focuses illumination from the light source.

8. The apparatus of claim 7, wherein the second optical module is a lens, and wherein the second optical module redirects illumination from the light source to follow a path parallel to the optical axis of the optical module.

9. The apparatus of claim 8, further comprising a prism in the optical path, wherein the prism bends the optical path so that the optical path is perpendicular to the sensor.

10. The apparatus of claim 9, wherein the prism is a mirror.

11. The apparatus of claim 1, further comprising: a processing unit comprising at least one operation stored thereon, wherein the operation scans objects.

12. The apparatus of claim 1, wherein the imaging sensor is powered through the communication interface connector.

13. The apparatus of claim 1, further comprising:
a light source directly mounted to the rigid circuit board.

14. The apparatus of claim 13, wherein the light source is a light emitting diode.

15. The apparatus of claim 13, wherein the light source is located behind the sensor.

16. The apparatus of claim 13, wherein the light source is located above the sensor.

17. The imaging scanner of claim 13, further comprising a second optical module in front of the light source, wherein the second optical module focuses illumination from the light source.

18. The imaging scanner of claim 13, wherein the communication interface connector is directly mounted to the bottom of the rigid circuit board, wherein a portion of the rigid circuit board is positioned in the handle of the housing and wherein the communication interface connector connects the imaging scanner to an external device.

19. The apparatus of claim 1, wherein the communication interface connector is mounted to the bottom of the rigid circuit board.

20. The apparatus of claim 1, wherein an angle between the rigid circuit board and the optical axis of the optical module is about ninety degrees.

21. The apparatus of claim 1, wherein a plane of the rigid circuit board is substantially not parallel to the plane of the optical axis of the optical module.

22. A method comprising:
positing a trigger on a handle;
positing a rigid circuit board in a gun-shaped housing;
positing an optical module in the gun-shaped housing, the optical module having an optical axis that is substantially parallel to the direction as pointed by the barrel of the gun-shaped housing;
directly mounting an imaging sensor having a sensor array on the rigid circuit board, wherein the imaging sensor is tilted with respect to the optical axis of the optical module positioned in front of the imaging sensor;
positing a switch on the rigid circuit board and extending to a part of the rigid circuit board into the handle portion of the gun-shaped housing to a sufficiently deep position for configuring the switch at a location to enable a pressing of the trigger on the handle to begin a scanning operation; and
directly mounting a light source to the rigid circuit board.

23. The method of claim 22, wherein the optical module is a lens.

24. The method of claim 22, further comprising illuminating a target object using the light source.

25. The method of claim 24, wherein the light source is located behind the imaging sensor.

26. The method of claim 24, further comprising focusing illumination from the light source using a second optical module positioned in front of the light source.

27. The method of claim 22, further comprising bending the optical axis of the optical module so that the optical axis of the optical module is perpendicular to the imaging sensor.

28. The method of claim 22, wherein the communication interface connector is coupled to the bottom of the rigid circuit board.

29. The method of claim 22, wherein an angle between the rigid circuit board and the optical axis of the optical module is about ninety degrees.

30. The method of claim 22, wherein a plane of the rigid circuit board is substantially not parallel to the plane of the optical axis of the optical module.

* * * * *